United States Patent
Dettori et al.

(10) Patent No.: US 9,667,680 B2
(45) Date of Patent: May 30, 2017

(54) STREAMING DATA ON DATA PROCESSES

(71) Applicant: International Business Machines Corporation, Armonk, NY (US)

(72) Inventors: Paolo Dettori, Elmsford, NY (US); Julio Nogima, White Plains, NY (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,064

(22) Filed: Dec. 21, 2015

(65) Prior Publication Data

US 2016/0112480 A1    Apr. 21, 2016

Related U.S. Application Data

(63) Continuation of application No. 13/969,305, filed on Aug. 16, 2013, now Pat. No. 9,219,771, which is a continuation of application No. 13/673,227, filed on Nov. 9, 2012, now Pat. No. 9,246,964.

(51) Int. Cl.
H04L 29/06    (2006.01)

(52) U.S. Cl.
CPC ...... *H04L 65/4069* (2013.01); *H04L 65/4084* (2013.01); *H04L 65/60* (2013.01); *H04L 65/601* (2013.01); *H04L 65/602* (2013.01)

(58) Field of Classification Search
CPC ..... H04L 65/00; H04L 29/00; H04L 65/4084; H04L 65/60; H04L 65/602; H04L 29/06
See application file for complete search history.

(56) References Cited

U.S. PATENT DOCUMENTS

| | | | |
|---|---|---|---|
| 6,330,675 B1 | 12/2001 | Wiser et al. | |
| 6,434,664 B1 * | 8/2002 | Buch | G06F 3/0611 |
| | | | 711/112 |
| 6,715,145 B1 | 3/2004 | Bowman-Amuah | |
| 6,839,062 B2 | 1/2005 | Aronson et al. | |
| 6,932,767 B2 | 8/2005 | Landry et al. | |
| 7,324,555 B1 * | 1/2008 | Chen | H04N 7/17336 |
| | | | 348/E5.008 |
| 7,797,064 B2 * | 9/2010 | Loomis | G11B 20/10 |
| | | | 700/94 |
| 2002/0049667 A1 | 4/2002 | Navani et al. | |
| 2003/0204551 A1 | 10/2003 | Chen | |
| 2003/0208378 A1 | 11/2003 | Thangaraj et al. | |

(Continued)

*Primary Examiner* — Arvin Eskandarnia
(74) *Attorney, Agent, or Firm* — Scully, Scott, Murphy & Presser, P.C.; Mercedes Hobson, Esq.

(57) ABSTRACT

A method, system and computer program product for servicing media content. In one embodiment, the media content is processed by having each of a group of services process increments of the media content, one increment at a time; and the order in which the services process these increments is orchestrated to process all of the media content in accordance with a defined procedure. In one embodiment, the increments of the media content are passed, one increment after another, to at least a plurality of the services in a defined order. In an embodiment, each time one of the plurality of services passes one of the increments of the media content to a subsequent one of the services in the defined order, the one of the plurality of services requests another increment of the media content from a preceding one of the services in the defined order.

18 Claims, 5 Drawing Sheets

(56) References Cited

U.S. PATENT DOCUMENTS

| | | | |
|---|---|---|---|
| 2004/0138948 A1* | 7/2004 | Loomis | G11B 20/10 |
| | | | 700/94 |
| 2004/0164987 A1 | 8/2004 | Aronson et al. | |
| 2004/0243556 A1 | 12/2004 | Ferrucci et al. | |
| 2005/0282137 A1 | 12/2005 | Sasinowski et al. | |
| 2006/0206635 A1* | 9/2006 | Alexander | G06F 13/28 |
| | | | 710/22 |
| 2007/0121526 A1* | 5/2007 | Sung | H04W 4/10 |
| | | | 370/252 |
| 2007/0143160 A1 | 6/2007 | Duke et al. | |
| 2008/0127183 A1 | 5/2008 | Emerson et al. | |
| 2009/0183216 A1* | 7/2009 | Crosby | H04H 60/04 |
| | | | 725/105 |
| 2009/0313300 A1* | 12/2009 | Dettori | G06F 9/542 |
| 2012/0173754 A1* | 7/2012 | Dalrymple | H04L 65/1096 |
| | | | 709/231 |

* cited by examiner

STREAMING DATA ON DATA PROCESSES

CROSS REFERENCE TO RELATED APPLICATIONS

This application is a continuation of copending U.S. patent application Ser. No. 13/969,305, filed Aug. 16, 2013, which is a continuation of U.S. patent application Ser. No. 13/673,227, filed on Nov. 9, 2012. The entire contents and disclosure of U.S. patent application Ser. Nos. 13/969,305 and 13/673,227 are hereby incorporated herein by reference.

BACKGROUND OF THE INVENTION

This invention generally relates to processing data, and more specifically, to processing media content in an incremental manner by a sequence of services.

In processes that involve media processing services, there is always a need to communicate the media content from service to service. As one service completes its processing, the service sends the processed media content to the next service in the workflow. Since media content is large, a considerable amount of time may be needed before being able to invoke the next service.

BRIEF SUMMARY

Embodiments of the invention provide a method, system and computer program product for servicing media content. In one embodiment, the method comprises using a multitude of services to process the media content by having each of the services process increments of the media content, one increment at a time; and orchestrating the order in which the services process the increments of the media content to process all of the media content in accordance with a defined procedure.

In an embodiment, content operations are requested from each of the multitude of services; and each of said services, in response to the request for content operations, indicates that said each service supports processing of increments of the media content.

In one embodiment, one of said services is a last service in said defined procedure; and after this last service has finished processing all of the increments of the media content, this last service indicates that the defined procedure to process all of the media content is complete.

In an embodiment, this last service requests an additional increment of the media content at multiple times; and in response to one of these requests for an additional increment of the media content, a message is sent to this last service indicating that no more data is to be processed by said last service.

In one embodiment, this last service indicates that the defined procedure is complete after the last service receives this message.

In an embodiment, each of a first group of the services obtains the increments of the media content from another one of the services.

In one embodiment, a message is sent to each service of the first group of the services identifying the other one of the services from which said each service obtains the increments of the media content.

In an embodiment, each service of the first group of services is informed of a specified port from which said each service obtains the increments of the media content.

In one embodiment, the increments of the media content are passed, one increment after another, to at least a plurality of the services in a defined order.

In an embodiment, each time one of said plurality of services passes one of the increments of the media content to a subsequent one of the services in the defined order, the one of the plurality of services requests another one of the increments of the media content from a preceding one of the services in the defined order.

Embodiments of the invention enable the processing of media content in a pipeline mode. Data are produced and consumed incrementally. This allows a workflow to complete much faster, increasing the efficiency of the whole process.

Embodiments of the invention provide a rich media middleware system and services that produce and consume media content. Embodiments of the invention configure the services to create and process content incrementally. Embodiments of the invention also define how data are exchanged among services in order to be processed sequentially as part of a workflow.

DETAILED DESCRIPTION

Figure 1:
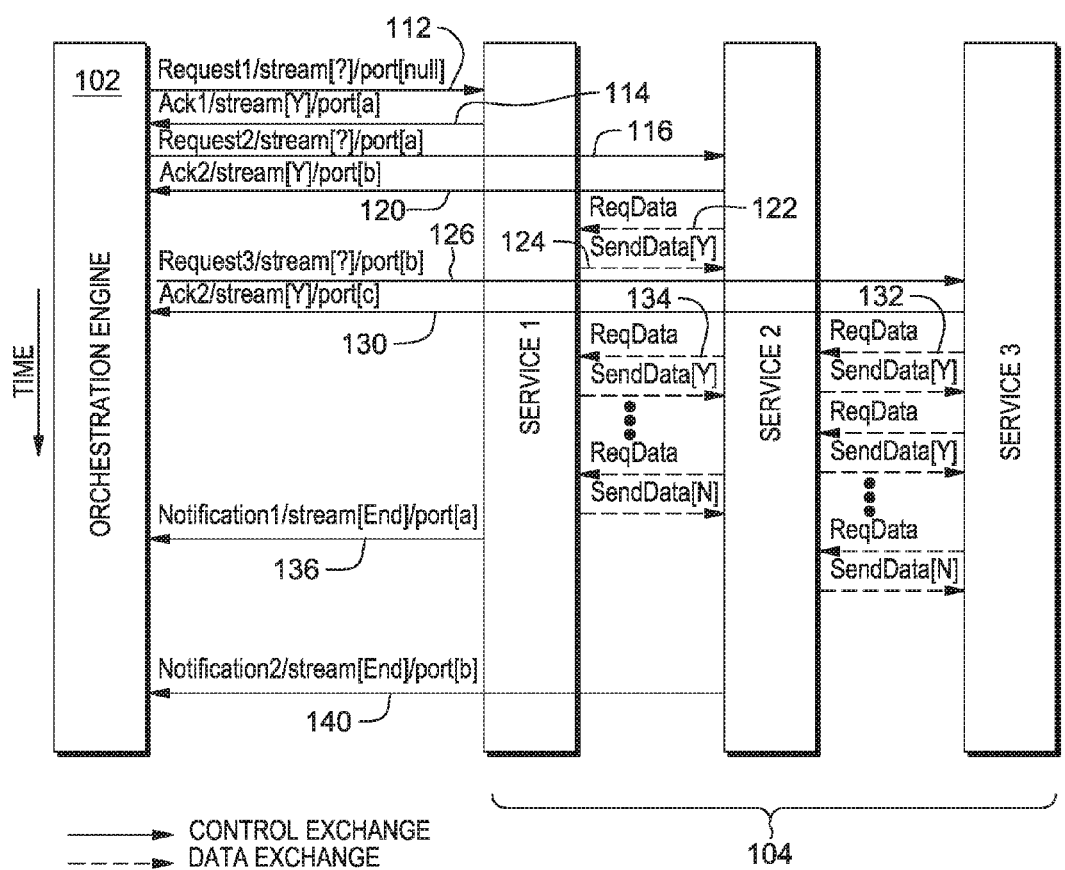
FIG. 1 illustrates a media content flow in accordance with an embodiment of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method, system and computer program product to process media content, and more specifically, to stream media content in content-centric business processes. With reference to FIG. 1, embodiments of the invention use a process orchestration engine 102 and media services 104 that can participate in a process. Generally, the orchestration engine 102 executes workflows (processes) involving media services, and the orchestration engine controls the execution flow by calling the services in the appropriate sequence and by setting up the services for the exchange of incremental data. The services 104 interact with each other to produce and consume the media content incrementally. In embodiments of the invention, media services in a workflow can be processing the same media content concurrently (but with each service working on different parts of the media content).

In embodiments of the invention, the services 104 implement two separate interfaces: one to communicate with the orchestration engine 102, and another for the exchange of data.

In the example shown in FIG. 1, three services support the incremental data exchange. Service 1 creates content, Service 2 transforms content, and Service 3 stores the content.

At 112, orchestration engine 102 sends a request message to Service 1 to produce a content. The request also inquires if the service supports incremental data creation. At 114, Service 1 sends an acknowledgement message to the orchestration engine 102 indicating that the Service supports creation of incremental data, and informing the orchestration engine of the port (port "a") where the created data will be made available.

At 116, the orchestration engine 102 invokes Service 2 to transform the content. The request message informs Service 2 that Service 1 is producing the data incrementally at port "a." The request message also asks if Service 2 can handle incremental data and what port Service 2 uses to stream the transformed data. At 120, Service 2, sends an acknowledgement message to the orchestration engine indicating that the Service supports incremental data, and specifying the port (port "b") the Service uses for the transformed data.

At 122, Service 2 requests data from Service 1 through port "a." At 124, a first piece of data is transferred from Service 1 to Service 2 for processing. In embodiments of the invention, subsequent pieces of data are transferred from Service 1 to Service 2 every time a processed piece of content is moved along in the workflow.

At 126, Service 3 is called by the orchestration engine 102 and informed that content for consumption is available at port "b" of Service 2. Service 3 is also asked if it can handle incremental data. At 130, Service 3 sends an acknowledgement message to the orchestration engine to inform the orchestration engine that Service 3 supports incremental data and makes the processed data available at port "c."

At 132, Service 3 requests data from Service 2 through port "b." A first piece of data is moved to Service 3 for processing. Since Service 3 is the last service in the chain, there will be no request to get processed data from Service 3. At 134, as processed content from Service 2 is moved along to Service 3, Service 2 asks for more content from Service 1.

The above-described interaction between services 104 through the respective ports continues until all pieces of data are moved from Service 1 to Service 3. If a Service requests more data and receives a response indicating that there is no more data, this indicates that the requesting service has reached the end of the content. When this happens, the service sends a notification message, for instance at 136 and 140, to the orchestration engine 102 informing the orchestration engine that the service has completed the request from the orchestration engine.

Figure 2:
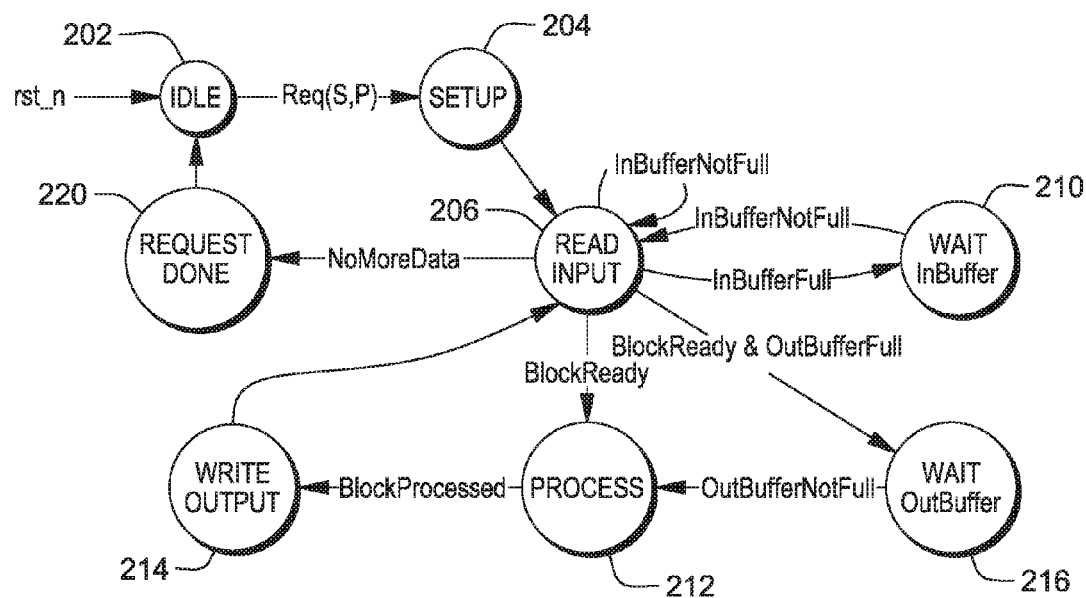
FIG. 2 shows the state diagram implemented by a service in embodiments of the invention.

FIG. 2 is a state diagram to be implemented by a service to support incremental data processing in embodiments of the invention. At state 202, the service is idle, and when the service receives a request from the orchestration engine 102, the service moves to a setup state 204, where the service prepares to perform the service it provides. From the setup state, the service transitions to state 206. At this state 206, the service reads input, which may be data from a previous service. As the service reads the input, some data may be put in a buffer, as represented at 210.

When ready, the service processes data and outputs processed data, as represented at 212 and 214. Processed data may be temporarily stored in a buffer, as represented at 216. After outputting data, the service returns to state 206 to process more data. This process is repeated until the service receives a message that no more data is available. When this occurs, the service, at 220, sends a message to the orchestration engine 102 indicating that the request from the orchestration engine has been completed. The service then returns to the idle state 202.

Figure 3:
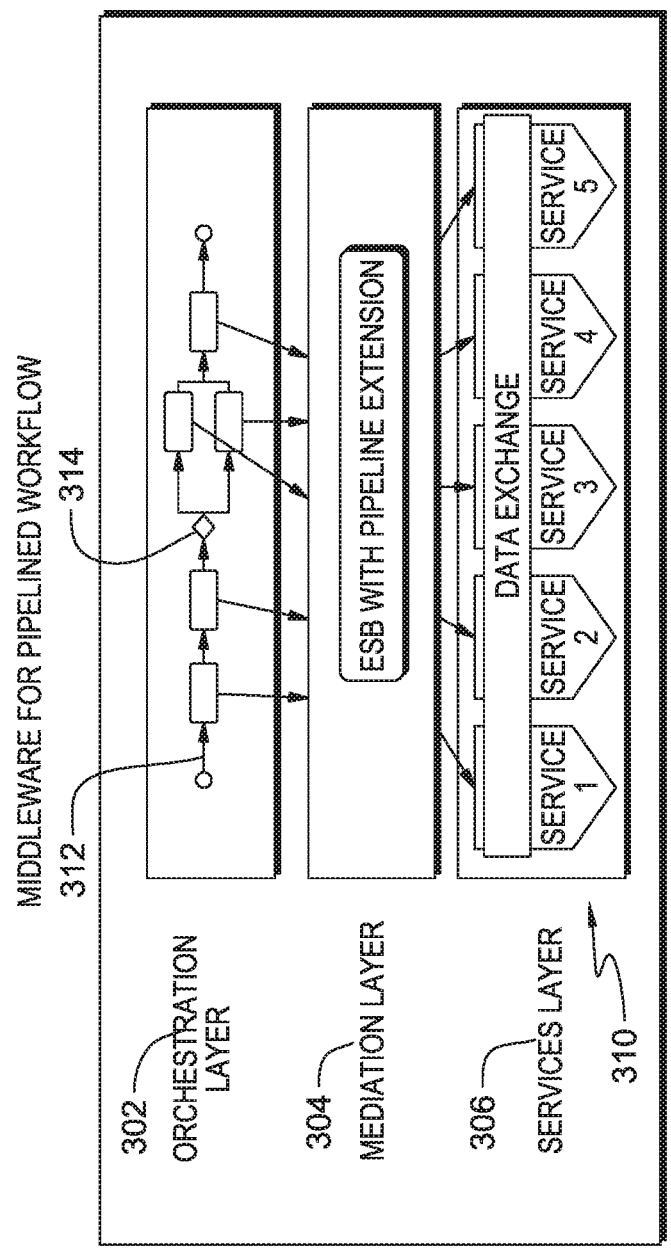
FIG. 3 depicts an alternate embodiment of the present invention.

FIG. 3 illustrates an alternate embodiment of the invention, comprising an orchestration layer 302, a mediation layer 304, and a services layer 306; and in this embodiment, five services 310 are provided. In operation, the orchestration layer executes workflows involving media services, and the orchestration layer controls the execution flow by calling the services in the appropriate sequence and by setting up the services for the exchange of incremental data. The services 310 interact with each other to produce and consume the media content incrementally; and the media services in the workflow can be processing the same media concurrently, but with each service working on different parts of the media content.

The orchestration layer 306 may implement a program, represented at 312, which determines whether, and in what order, the services 310 are invoked. With the embodiment represented in FIG. 3, not all the services are performed for each increment of data. Depending on the decisions made in program 312 at 314, some data will be processed by Service 3 and other data will be processed by Service 4.

Mediation layer 304 implements the two separate interfaces: one for the communications between the orchestration layer 302 and the services layer 306, and another for the exchange of data.

Embodiments of the invention allow a workflow to complete much faster, increasing the efficiency of the entire media processing. As an example, FIG. 4 shows, at 402, how long it may take to process media content in a conventional manner and, at 404, how long it may take to process that media content by using an embodiment of this invention.

Figure 4:
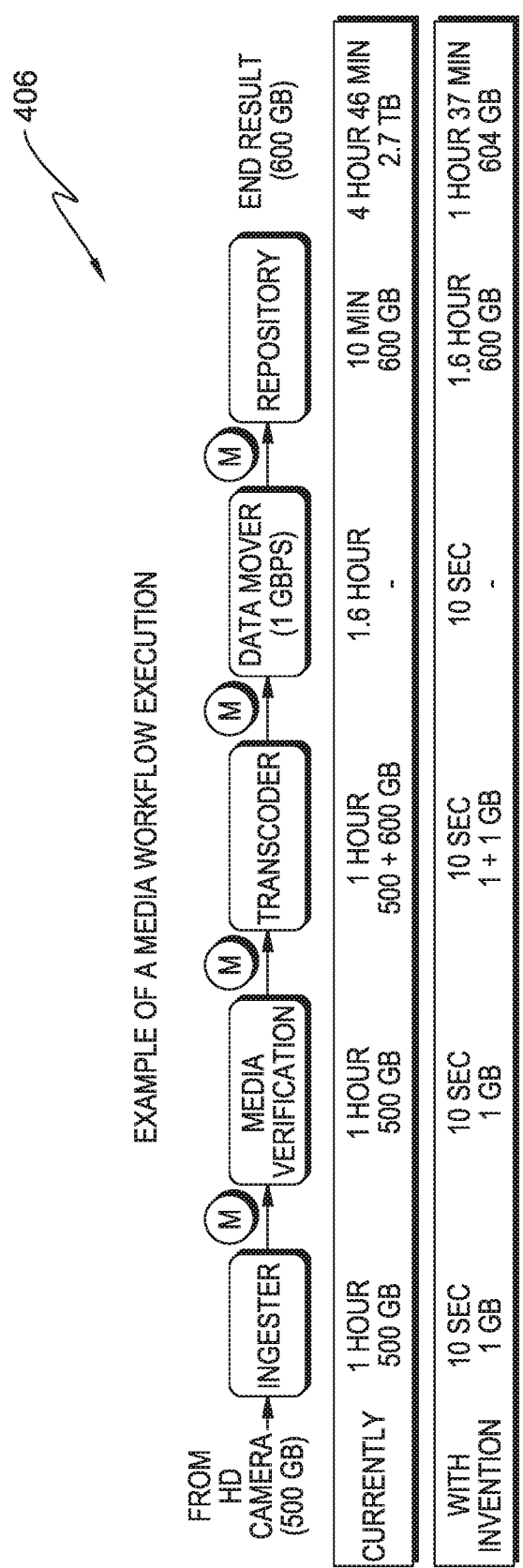
FIG. 4 shows two examples of a media workflow execution, one without the invention and one with an embodiment of the invention.

With the examples shown in FIG. 4, the media content is data from a high definition camera, and the media content is processed by five services 406. With the conventional approach 402, all the data, 500 GB, from the camera, is fully processed by each service, one service at a time. Each of the first three services takes an hour to process the data, the fourth service takes 1.6 hours, and the last service takes ten minutes. The processing thus takes four hours and forty-six minutes.

With using an embodiment of the invention, the 500 GB input from the camera are processed in 1 GB increments. When the first service finishes processing an increment of data, that data is passed to the second service and the first service begins to process another increment of the input data. When the second service finishes processing this increment of data, that increment of data is passed to the third service. The second service, at about the same time, receives a second increment of data from the first service.

The increments of data are processed and passed in this way, from one service to the next, until all the data have been received and processed by the last service. Each of the first four services takes approximately ten seconds to process each increment of data; and the last service, repository, takes about 1.6 hours to process all the data. The entire amount of time needed to process the input from the camera is approximately one hour and thirty-seven minutes, which is about one-third of the times required by the current approach.

Figure 5:
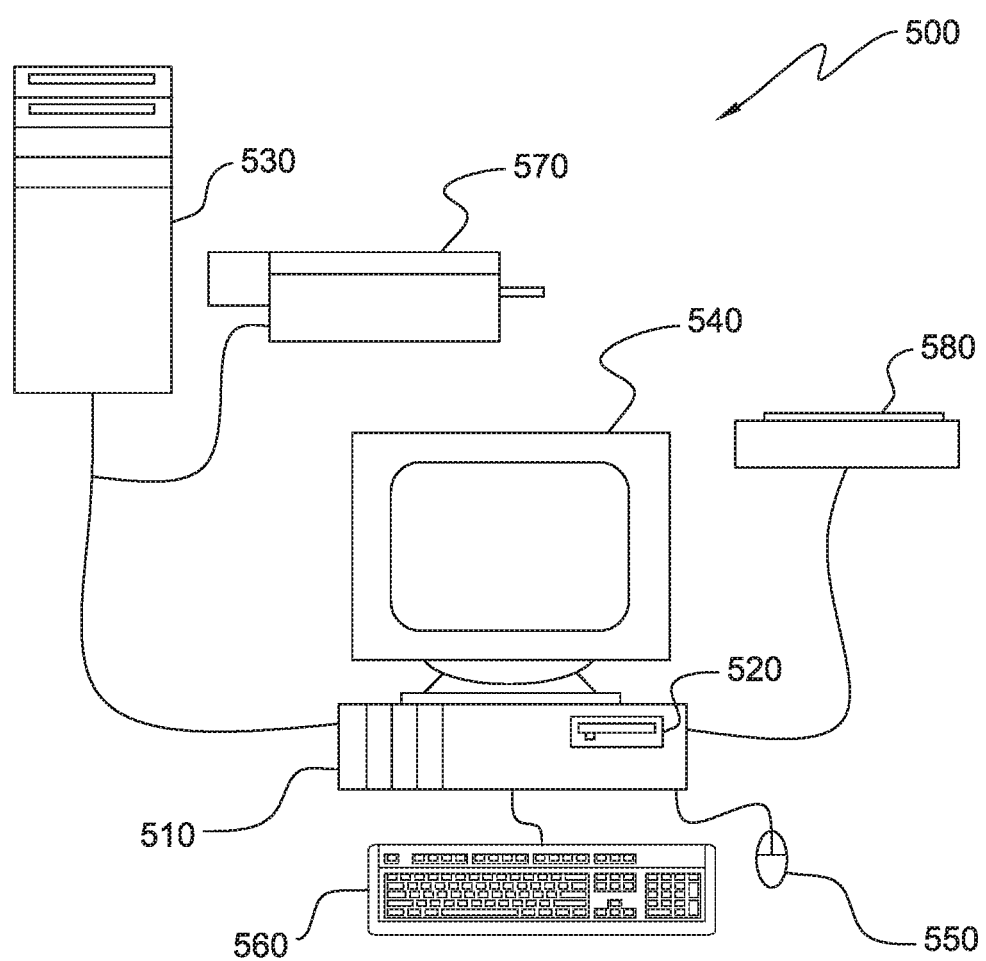
FIG. 5 shows a computing environment in which embodiments of the invention may be implemented.

A computer-based system 500 in which embodiments of the invention may be carried out is depicted in FIG. 5. The computer-based system 500 includes a processing unit 510, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 510 through a disc drive 520, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 510, as mentioned, or may be located on a remote system such as a server 530, coupled to processing unit 510, via a network interface such as an Ethernet interface. Monitor 540, mouse 550 and keyboard 560 are coupled to the processing unit 510, to provide user interaction. Scanner 580 and printer 570 are provided for document input and output. Printer 570 is shown coupled to the processing unit 510 via a network connection, but may be coupled directly to the processing unit. Scanner 580 is shown coupled to the processing unit 510 directly, but it should be understood that peripherals might be network coupled, or direct coupled without affecting the performance of the processing unit 510.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention. The invention may be implements in various embodiments with various modifications as are suited to the particular use contemplated.

What is claimed is:

1. A method of servicing media content, comprising:
   receiving specified media content at one or more processing units;

using a multitude of services operating on the one or more processing units to process the media content by having each of the services process increments of the media content, one increment at a time;

executing the one or more processing units, implementing a media content servicing program, for orchestrating the order in which the services process the increments of the media content to process all of the media content in accordance with a defined procedure, including orchestrating the exchange of the increments of the media content among the services in a defined sequence, and using different ones of the services to process simultaneously different ones of the increments of the media content to reduce a time needed to service all of the specified media content; and at defined times, each of a plurality of the services sending a notification message indicating that said each service has completed processing all the increments of the media content.

2. The method according to claim 1, wherein the using a multitude of services to process the media content includes:

requesting content operations from each of the multitude of services; and each of said services, in response to the request for content operations, sending a message indicating that said each service supports processing of increments of the media content.

3. The method according to claim 1, wherein:

one of said services is a last service in said defined procedure; and the using a multitude of services to process the media content includes, after said last service has finished processing all of the increments of the media content, said last service indicating that the defined procedure to process all of the media content is complete.

4. The method according to claim 3, wherein the using a multitude of services further includes:

said last service requesting an additional increment of the media content at multiple times; and in response to one of the requests for an additional increment of the media content, sending to said last service a message indicating that no more data is to be processed by said last service.

5. The method according to claim 4, wherein the last service indicates that the defined procedure is complete after said last service receives said message.

6. The method according to claim 1, wherein the orchestrating the exchange of the increments of the media content among the services includes:

each of a first group of the services obtaining the increments of the media content from another one of the services; and identifying to each service of the first group of the services the other one of the services from which said each service obtains the increments of the media content.

7. The method according to claim 1, wherein the orchestrating the exchange of the increments of the media content among the services further includes informing each service of a first group of the services of a specified port from which said each service obtains the increments of the media content.

8. The method according to claim 1, wherein the orchestrating includes passing the multitude of increments, one increment after another, to at least a plurality of the services in a defined order.

9. The method according to claim 8, wherein each time one of said plurality of services passes one of the increments of the media content to a subsequent one of the services in the defined order, said one of the plurality of services requests another one of the increments of the media content from a preceding one of the services in the defined order.

10. The method according to claim 1, wherein:

the receiving specified media content includes receiving the specified media content from a digital camera.

11. The method according to claim 1, wherein the orchestrating the order in which the services process the increments of the media content includes:

identifying ports of the one or more processing units at which the increments of the media content are available; and one or more of the services obtaining the increments of the media content from the identified ports.

12. The method according to claim 1, wherein:

the orchestrating the exchange of the increments of the media content includes using an orchestration engine to orchestrate the increments of the media content; and the each of a plurality of the services sending a notification message includes each of the plurality of the services sending the notification message to the orchestration engine indicating that said each service has completed processing all the increments of the media content.

13. The method according to claim 12, wherein:

the using a multitude of services to process the media content includes each of the plurality of services requesting increments of the media content from one of the other services; and at specified times, each of the plurality of services receiving a message indicating that there is no more media content.

14. The method according to claim 13, wherein:

the each of the plurality of services sending a notification message further includes said each of the plurality of services sending the notification message when said each service receives the message indicating that there is no more media content.

15. A method of orchestrating servicing of media content, comprising:

requesting incremental media content processing from each of a multitude of services;

each of the services sending a message indicating that said each service supports incremental media content processing;

each of the services processing increments of the media content, one increment at a time;

orchestrating the order in which the services process the increments of the media content pursuant to a defined program to process all of the media content, including each of a first plurality of the services identifying a port at which said each service makes processed media content available to another of the services, and passing the increments of the media content to said another of the services via said identified port, each of a second plurality of the services obtaining the increments of the media content from another one of the services, and using different ones of the services to process simultaneously different ones of the increments of the media content to reduce a time needed to service all of the specified media content; and at defined times, each of the second plurality of the services sending a notification message indicating that said each service has completed processing all the increments of the media content.

16. The method according to claim 15, wherein one of said services, after all of the increments of the media content have been processed according to the defined program, sending a message indicating that the defined program is complete.

17. The method according to claim 15, wherein the orchestrating further includes identifying to each of the second plurality of the services the other one of the services from which said each service obtains the increments of the media content.

18. The method according to claim 15, wherein the orchestrating further includes passing the multitude of increments, one increment after another, to the second plurality of the services in a defined order.

* * * * *